United States Patent
Dugonjic-Bilic et al.

(10) Patent No.: US 11,718,781 B2
(45) Date of Patent: Aug. 8, 2023

(54) METHOD TO PRODUCE A SCALE INHIBITOR

(71) Applicant: TouGas Oilfield Solutions GmbH, Frankfurt am Main (DE)

(72) Inventors: Fatima Dugonjic-Bilic, Offenbach (DE); Benjamin Gerlach, Aschaffenburg (DE); Jasmin Meurer, Mainz (DE); Marita Neuber, Dreieich (DE)

(73) Assignee: TouGas Oilfield Solutions GmbH, Frankfurt am Main (DE)

( * ) Notice: Subject to any disclaimer, the term of this patent is extended or adjusted under 35 U.S.C. 154(b) by 176 days.

(21) Appl. No.: 16/619,971

(22) PCT Filed: Jun. 5, 2018

(86) PCT No.: PCT/EP2018/064715
§ 371 (c)(1),
(2) Date: Dec. 6, 2019

(87) PCT Pub. No.: WO2018/224478
PCT Pub. Date: Dec. 13, 2018

(65) Prior Publication Data
US 2020/0199439 A1    Jun. 25, 2020

(30) Foreign Application Priority Data
Jun. 7, 2017  (EP) .................... 17174700

(51) Int. Cl.
*E21B 43/26* (2006.01)
*C09K 8/536* (2006.01)
*C09K 8/52* (2006.01)
*C09K 8/68* (2006.01)
*E21B 37/06* (2006.01)

(52) U.S. Cl.
CPC .............. *C09K 8/536* (2013.01); *C09K 8/52* (2013.01); *C09K 8/68* (2013.01); *E21B 37/06* (2013.01); *E21B 43/26* (2013.01); *C09K 2208/26* (2013.01)

(58) Field of Classification Search
CPC .. C09K 8/536; C09K 8/52; C09K 8/68; C09K 2208/26; E21B 37/06; E21B 43/26
See application file for complete search history.

(56) References Cited

U.S. PATENT DOCUMENTS

| | | |
|---|---|---|
| 5,277,823 A | 1/1994 | Hann et al. |
| 6,395,185 B1 | 5/2002 | Gauthier et al. |
| 7,205,264 B2 * | 4/2007 | Boles ............ C09K 8/74 507/225 |
| 2010/0311623 A1* | 12/2010 | Rey ............ C09K 8/90 252/180 |
| 2013/0324443 A1* | 12/2013 | Wang ........... C04B 24/2641 507/121 |
| 2014/0353042 A1 | 12/2014 | Karale et al. |
| 2015/0075795 A1* | 3/2015 | Wheeler ........ C09K 8/685 166/305.1 |
| 2016/0264850 A1* | 9/2016 | Okunola ........ C09K 8/90 |
| 2017/0145292 A1* | 5/2017 | Szalai ........... C09K 8/512 |
| 2018/0313199 A1* | 11/2018 | Huang .......... C09K 8/62 |

OTHER PUBLICATIONS

Zhang et al., "Testing the formation of Ca-phosphonate precipitates and evaluating the anionic polymers as Ca-phosphonate precipitates and CaCO₃ scale inhibitor in simulated cooling water," Corrosion Science, Elsevier Ltd., (vol. 52), (p. 3883-3890), (2010).

Wang et al., "Calcium carbonate inhibition by a phosphonate-terminated poly(maleic-co-sulfonate) polymeric inhibitor," Desalination, Elsevier B.V., (vol. 249), (p. 1-4), (2009).

Li et al., "Inhibition of scale buildup during produced-water reuse: Optimization of inhibitors and application in the field," Desalination, Elsevier B.V., (vol. 351), (p. 213-219), (2014).

* cited by examiner

*Primary Examiner* — Silvana C Runyan
(74) *Attorney, Agent, or Firm* — Hammer & Associates, P.C.

(57) ABSTRACT

A method for the preparation of a scale inhibitor and a method of inhibiting the formation of scale uses a water soluble polymeric gelling agent, in particular synthetic polymer, which has been degraded and reduced in its molecular weight.

8 Claims, No Drawings

METHOD TO PRODUCE A SCALE INHIBITOR

The resources for fossil fuels are highly exploited and also limited. With new and improved technologies, these resources for oil and gas can be further exploited and unconventional reservoirs can be accessed. With the increasingly challenging conditions for the oil and gas production the requirements for the equipment and the chemicals also become more and more demanding.

Several techniques are used to increase oil and gas production from formations with low permeability or from exploited oil and gas field, as hydraulic fracturing, acidizing or enhanced oil recovery.

Hydraulic fracturing is applied to increase the permeability of the formation for oil and gas by pumping fluid together with proppant under high pressure into the formation to create fractures. These fractures are kept open by proppants and allow oil and/or gas from the formation to diffuse to the production well.

Typically, the fracturing fluid has to fulfil several requirements:

(i) It must carry the proppants and place them in into the fractures. Typically, viscosified fluids are used. Natural based as well as synthetic polymers are used to viscosify the fluid. When water based fluids are used typically water soluble polymers are added to fulfil the requirements. The polymers can be natural based polymers or synthetic polymers.

(ii) The viscosity of the frac fluid must be reduced after the frac job to make sure that it can be removed from the well as thoroughly as possible. Breakers are added to the fluid that degrade the polymer after the proppants are placed.

(iii) The fluid must be pumped with low pumping energy. Friction reducer and rheology modifiers are added to minimize friction lost during pumping the fluid.

(iv) A filter cake must be formed to prevent fluid loss into the formation.

(v) The precipitation of solids must be prevented. It can be caused by reaction of components containing in the frac fluid with components containing in the formation water or by changed conditions like temperature or pH in the formation during pumping of the frac fluid. Typically, scale inhibitors are added to the fluid to prevent precipitations.

As there are so many requirements for the frac fluid, the process for hydraulic fracturing is complex and prone to disturbances. Simplification of the process by combination of steps and combining two performances in one additive is of great advantage.

Water soluble polymers as viscosifier High molecular water soluble polymers are typically used as viscosifier in the frac fluid. The polymers can be natural based polymers or synthetic polymers. Besides their property to make the fluid more viscous the polymers fulfil various tasks. Amongst others they function as rheology modifier, fluid loss additive, friction reducer, viscosifier or precursor for crosslinked hydrogels.

As natural based polymers, typically polysaccharides or modified polysaccharides are used. For instance, suitable hydratable polysaccharides include starch or its derivatives, galactomannan gums, glucomannan gums, cellulosic derivatives, preferably carboxymethyl cellulose; cellulose ether, preferably hydroxyethyl cellulose; guar gums or its derivatives, preferably hydroxyalkyl guar, carboxyalkyl guar, and carboxyalkyl hydroxyalkyl guar or hydrophobically modified guar alginates, carrageenan's, tragacanth gums, glucan gums and xanthan gums.

All the natural based polymers have in common that due to their glycosidic bonds they are not stable at elevated temperatures and under acidic conditions. They are also easily attacked and degraded by bacteria and their dispersions and solutions have to be protected by biocides even when they are handles or stored only for short periods of time. Furthermore, the availability of natural based polymers may depend on wear conditions and crop yield. This dependence impacts the availability and the price of natural based polymers.

Therefore, often synthetic polymers based on acrylamide are used for applications in the oil and gas production as substitutes for natural based polymers. They are independent from bad wear conditions and distinguish themselves with marked better temperature and chemical stability and resistance against bacterial degradation. Acrylamide can be copolymerized with a broad variety of monomers to adjust the properties of the resulting water soluble polymer. Amongst others, ethylenically unsaturated carboxylic, sulfonic or phosphonic acids, their esters, unsubstituted or N- and N,N-substituted derivatives of amides of ethylenically unsaturated carboxylic acids, N-substituted (cyclic) derivatives of ethylenically unsaturated amides can be used.

The viscosity of fluids containing polymers as thickener can be further increased by crosslinking the polymer chains to form a hydrogel, that is a three dimensional network of extremely high molecular weight.

Typically, polyvalent cations of group IIIA, IVB, VB, VIB, VIIB and/or VIIIB of the periodic table of the elements are used as crosslinking compound, preferred are compounds of boron, zirconium, titanium, aluminum or chromium, for both synthetic polymers and natural polymers.

The viscosity of the viscosified fluids or of the crosslinked hydrogels may range from about 10 mPas to several 1000 mPas.

Breaking

In well stimulation processes the viscosity of the frac fluid must be reduced after placing of the proppants to ensure the removal of the fluid from the bore hole to prevent blockage of the pores and fractures by the highly viscos gel and to minimize formation damage.

For the reduction of the viscosity of the fluid typically the water-soluble polymer is degraded by so called breakers. The breakers cleave the high molecular polymer chain into fragments of lower molecular weight and/or deactivate the crosslinking compound.

Solutions of high molecular weight polymers show a high viscosity. Cleaving bonds in the polymer chain gives fragments of lower molecular weight; the viscosity of their solution is reduced. The viscosity of polymer solutions is therefore related to the molecular weight of the polymer.

Analytically the degradation of the polymer chain or network can be characterized by rheological methods in determining the viscosity of the polymer solution. As polymer solutions, typically are non-Newtonian fluids it is important to compare the results only when the methods for the determination of the viscosity were exactly the same.

The polymer degradation can be followed either directly in a rheometer or by determination of the viscosity of the polymer solution before and after breaking treatment.

Typically, oxidizers, enzymes or acids are used as breakers.

Enzymes are generally used for naturals based polymers in a low temperature range from about 20° C. to 70° C. At higher temperature, they denature and become ineffective. Acids also break the glycosidic linkage by hydrolysis. However, the breaking process is difficult to control, the chemical compatibility with the viscosified fluid and its additives is difficult and corrosion of the metal equipment may occur.

Typically, oxidative breakers are used as breaker for natural based polymers as well as synthetic polymers. In the literature, a broad variety of oxidative breakers is described, e.g. persulfates, perborates, percarbonates, peroxides, bromates, chlorites. The oxidative breakers have in common that they are able to release hydrogen peroxide that is a strong oxidizing agent. The polymer chain is degraded by oxidative processes.

Also organic peroxides organic peroxides comprising organic percarbonates, organic peroxydicarbonates, diacyl peroxides, dialkyl peroxides, alkylhydroperoxides and ester of peracids can degrade the polymer chain and are used to break the polymer chain and reduce the viscosity of the fluid.

The viscosity of completely degraded polymer solutions is in general <5 mPas, often below <1 mPas.

Scale Inhibitors

Scaling can cause huge damage by clogging the formation or the tubing and reducing or even stopping the flow of oil and gas. Scaling can have a large variety of causes and a lot of salts can contribute to scale formation. The most common scales in the oil industry and the main reasons for their formation are the following:

(i) Calcium carbonate scale. $Ca(HCO_3)_2$ is very water soluble. However scaling of $CaCO_3$ can occur when there is pressure drops in the production system. Then $CO_2$ can disappear from the system, the pH increases and poorly soluble $CaCO_3$ precipitates.

(ii) Sulfate scale. Group II metal ions, with the exception of Mg, form sparingly soluble sulfates. Sulfate scales are usually formed when formation water and injected seawater or salt water from other sources mix. $BaSO_4$ is the most insoluble scale and the hardest to control. $CaSO_4$ is poorly soluble in water and soluble in chelate dissolvers.

(iii) Sulfide scale. Sulfide can be present in the formation as $H_2S$ or generated by bacteria from sulfat ions present in the injected fluid. Ferric ions generated mainly by corrosion of steel equipment can react with sulphide ions to form FeS.

(iv) Halite scale. Scaling of NaCl can be induced when the temperature drops and the solubility decreased.

A wide range of products has been developed to prevent scaling, see e.g. *Production Chemicals for the Oil and Gas Industry*, M. A. Kelland, p. 56 ff.

First scale inhibitors used for the prevention of $CaCO_3$ scale for boiler water and to protect heat exchanger surfaces were Phosphates and polyphosphates. However, due to their low temperature stability—nowadays—they are not often used in the oil and gas industry anymore. Organophosphorous compounds like phosphorous esters and especially phosphonates are common scale inhibitors due to their increased stability. Especially the group of aminophosphonates has gained great importance for the prevention mainly for carbonate and sulfate scale. By variation of the amines and the numbers of phosphonate groups their characteristics can be adjusted to a wide range of demands. They are effective against $CaCO_3$ and sulfate scales.

Beside phosphates and phosphonate organic polymers in general are used as dispersant and scale inhibitor. Low molecular polyacrylic acid was claimed already in 1957 as scale inhibitor for boiler water in U.S. Pat. No. 2,783,200. It is used as $CaCO_3$ inhibitor, however, its use is limited due to its inability to remain in solution at high Ca concentration. Besides polyacrylates also polyvinylsulfonates, polyacrylamides an polymalates are used for scale control of $CaCO_3$ and $BaSO_4$ in waters containing low concentrations of scale forming ions. The molecular weight of the polymers plays an important role for their performance. It is typically <100 000 g/mol, often <10 000 g/mol. Polymers with less than about 1000 g/mol or more than 100 000 g/mol seem to be less effective.

The copolymerization of acrylic acid or methacrylic acid with different monomers bearing e.g. sulfonate groups as vinyl sulfonic acid or 2-acrylamido-2methylpropyl sulfonic acid greatly enhances the Ca tolerance and further the efficiency of organic polymers.

Often the oil and gas reservoirs are located in arid regions where fresh water supply is limited. Therefore, the use of seawater, formation water or sorts of process or industrial water is necessary to prepare water based frac fluids. This increases the risk of scaling, especially of sulfate scaling in case seawater is injected into the formation. Furthermore, the reservoirs become deeper and deeper, so temperature and pressure increase. This can create further scaling especially in case of $CaSO_4$ as its solubility decreases with increasing temperature. Scale inhibitors have to withstand harsh conditions and work efficiently over a broad range of pressure and temperature.

There is a need for scale inhibitors for aqueous systems which can be used in water with high level of scale forming ions and which are effective even under harsh conditions like temperature and pressure.

Surprisingly, it was found, that broken copolymers of originally high molecular weight polymers comprising structural units carrying sulfonic acid groups, such as structural units derived from 2-(meth)acryl-amido-2-methylpropanesulfonic acid, and comprising structural units carrying phosphonic acid groups, such as structural units derived from vinylphosphonic acid, and comprising structural units carrying amide groups, such as structural units derived from (meth)acrylamide meet these requirements.

The use of polymeric scale inhibitors that incorporate monomers bearing phosphonic groups into polymers with carboxylic, sulfonate, amide or malate groups is known. For example, U.S. Pat. No. 4,650,591 describes a method of inhibition corrosion and scale by adding to the system a low molecular weight copolymer comprising (meth)acrylic acid, 2-(meth)acrylamide-2-methylpropylsulphonic acid and 2-(meth)acrylamide-2-methylpropylphosphonic acid. The low molecular weight of the polymers is critical in regard to the efficiency of the invention and is given as intrinsic viscosity of a polymer solution.

In EP-A-0,401,833 a polymer bearing aminophosphonic groups which are bonded to polyacrylic acid by esterification is claimed as corrosion and scale inhibitor. The polymer is used as scale inhibitor for $CaCO_3$.

U.S. Publication 2007/0062879 claims a process to inhibit the formation of scale by adding to the water a copolymer of an unsaturated phosphonic acid with an unsaturated sulphonic acid or an unsaturates carboxylic acid or a terpolymer of an unsaturated phosphonic acid with an unsaturated sulphonic acid and an unsaturated carboxylic acid.

U.S. Publication 2011/0046023 describes a method for inhibiting corrosion and scale formation in aqueous system by adding a polymer comprising 1 to 100% by weight of a phosphorous containing amide monomer. The phosphorous group can be derived from phosphoric acid, like 2-methacrylamidoethylphosphoric acid or phosphoethyl-methacrylamide monoester, or from phosphonic acid. The molecular weight of the polymer is between 1 000 and 200 000 g/mol.

WO 2013152832 discloses the use of a copolymer comprising 0.1 to 10 mol-% of structural units derived from vinylphosphonic acid, 40 to 80 mol-% of structural units derived from 2-acrylamido-2-methylpropylsulfonic acid and 1 to 50 mol-% of structural units derived from acrylic acid and/or acrylamide for the inhibition and/or dispersion of inorganic sulphide scale. In contrast to other scale inhibitors the molecular weight of such copolymer is high and ranges from 100 000 to 10 000 000 g/mol.

According to this knowledge it was very surprising that the broken polymer acted as scale inhibitor even at high temperature and high ion concentrations.

Therefore, the present invention relates to a method to prepare a scale inhibitor comprising the measures (i) providing a viscosified treatment fluid containing at least water, a water soluble polymeric gelling agent and a breaker compound,
(ii) pumping such treatment fluid into the formation and
(iii) allowing the breaker to degrade the polymer and to form polymer fragments that are effective in inhibiting scale.

The present invention relates also to a method of inhibiting the formation of scale comprising the measures (i) providing a viscosified treatment fluid containing at least water, a water soluble polymeric gelling agent and a breaker compound,
(ii) pumping the treatment fluid into the formation,
(iii) allowing the breaker to degrade the polymer and to form polymer fragments that inhibit scaling.

The pumping in measure (ii) is typically performed until a pre-set desired pressure is reached. Such pressure depends on the individual formation and/or equipment being used.

A further aspect of the present invention relates to the use broken and degraded polymer and polymer fragments as scale inhibitor in formations or resources containing crude oil and natural gas.

Polymeric Gelling Agent

According to the instant invention, the water-soluble polymer is a gelling polymer acting as viscosifying agent. The water soluble gelling polymer used in the invention is a synthetic polymer.

Synthetic based polymers according to this invention are water soluble synthetic polymers acting as viscosifying agent, in particular such synthetic polymer material are synthetic polyacrylamide based polymers, copolymers or terpolymers.

Preferably, the synthetic polymer used in the instant invention is a synthetic polymer comprising:

(I) at least structural units of formula (I)

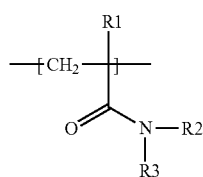

(I)

wherein
R1, R2 and R3 independently are hydrogen or $C_1$-$C_6$-alkyl,
(II) from 1 to 95% by weight structural units of formula (II)

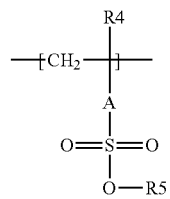

(II)

wherein
R4 is hydrogen or $C_1$-$C_6$-alkyl,
R5 is hydrogen, a cation of an alkaline metal, of an earth alkaline metal, of ammonia and/or of an organic amine,
A is a covalent C—S bond or a two-valent organic bridging group,
(III) from 0 to 50% by weight structural units of formula (III)

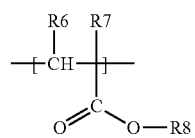

(III)

wherein
R6 and R7 are independently of one another hydrogen, $C_1$-$C_6$-alkyl, —COOR$_9$ or —CH$_2$—COOR$_9$, with R$_9$ being hydrogen, a cation of an alkaline metal, of an earth alkaline metal, of ammonia and/or of an organic amine,
R8 is hydrogen, a cation of an alkaline metal, of an earth alkaline metal, of ammonia and/or of an organic amine, or is $C_1$-$C_6$-alkyl, a group —$C_nH_{2n}$—OH with n being an integer between 2 and 6, preferably 2, or is a group —$C_oH_{2o}$—NR10R11, with o being an integer between 2 and 6, preferably 2, and
R10 and R11 are independently of one another hydrogen or $C_1$-$C_6$-alkyl, preferably hydrogen,
(IV) from 0 to 95% by weight structural units of formula (IV)

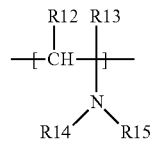

(IV)

wherein
R12 and R13 are independently of one another hydrogen, $C_1$-$C_6$-alkyl, —COOR16 or —CH$_2$—COOR16, with R16 being hydrogen, a cation of an alkaline metal, of an earth alkaline metal, of ammonia and/or of an organic amine,
R14 is hydrogen or, $C_1$-$C_6$-alkyl, and
R15 is —COH, —CO—$C_1$-$C_6$-alkyl or R14 and R15 together with the nitrogen atom to which they are attached form a heterocyclic group with 4 to 6 ring atoms, preferably a pyridine ring, a pyrrolidone ring or a caprolactame ring, (V) from 0 to 20% by weight structural units of formula (V)

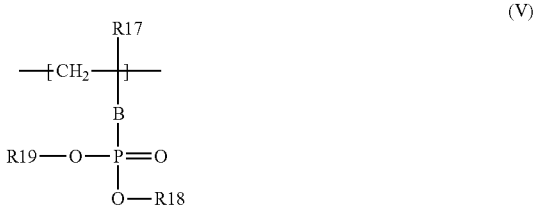

wherein

R17 is hydrogen or, $C_1$-$C_6$-alkyl, and

R18 and R19 are independently of one another hydrogen, a cation of an alkaline metal, of an earth alkaline metal, of ammonia and/or of an organic amine, B is a covalent C—P bond or a two-valent organic bridging group, with the proviso that the percentage of the structural units of formulae (I) to (V) refer to the total mass of the copolymer and the percentage of the structural units of formulae (I) to (V) amounts to 100%.

The polymer used in the instant invention may further contain crosslinking monomers, which are monomers with more than one ethylenically unsaturated group. Different compound classes can be used, such as bis-amides, e.g. methylene-bis-acrylamide, bis-, tris- or tetraether derived from two-, three- or tetravalent alcohols and from ethylenically unsaturated halides e.g. trimethylolpropane diallylether, pentaerithriol-triallylether and tetrallyloxyethane, or esters of ethylenically unsaturated carboxylic acids with multivalent alcohol, e.g. di-, tri-, or tetraacrylates derived from ethyleneglycol, from trimethylolpropanol or from pentaerythrite, or di-, tri-, or polyamines which are substituted at the nitrogen atom with ethylenically unsaturated residues, such as N,N'-diallyl-ethylenediamine or triallylamine. Crosslinker monomers, if present, typically are used in amounts between 0.01 and 5% by weight, preferably between 0.05 and 1% by weight, referring to the total amount of monomers used.

The $C_1$-$C_6$-alkyl groups being present in the above formulae (I) to (V) are independently of each other and may be straight chain or branched. Examples of alkyl groups are methyl, ethyl, n-propyl, iso-propyl, n-butyl, sec.-butyl, tert.-butyl, n-pentyl or n-hexyl. Ethyl and especially methyl are preferred.

The group A may be a C—S-covalent bond or a two-valent organic group. Examples thereof are $C_1$-$C_6$-alkylene groups or —CO—$C_1$-$C_6$-alkylene groups. The alkylene groups may be straight chain or branched. Examples of A groups are —$C_pH_{2p}$— groups or —CO—NH—$C_pH_{2p}$— groups, with p being an integer between 1 and 6. —CO—NH—$C(CH_3)_2$—$CH_2$— or a C—S-covalent bond is a preferred group A.

The group B may be a C—P-covalent bond or a two-valent organic group. Examples thereof are $C_1$-$C_6$-alkylene groups. These groups may be straight chain or branched. Examples of alkylene groups are —$C_qH_{2q}$— groups, with q being an integer between 1 and 6. Methylene or a C—P-covalent bond is a preferred group A.

The structural units of formula (I) are derived from an ethylenically unsaturated carboxylic acid amide selected from the group of acrylamide, methacrylamide and/or their N—$C_1$-$C_6$-alkyl derivatives or N,N—$C_1$-$C_6$-dialkyl derivatives.

Preferred polymers used in the instant invention further contain structural units of formula (II) to (V) which are derived from an ethylenically unsaturated sulfonic acid and/or its alkaline metal salts and/or their ammonium salts, from N-vinylamides, and/or an ethylenically unsaturated phosphonic acid and/or its alkaline metal salts and/or their ammonium salts, optionally together with further copolymerisable monomers.

Other preferred copolymers used in the instant invention are those, wherein B is a C—P covalent bond or a —$C_qH_{2q}$— group with q being an integer between 1 and 6, preferably 1, and/or wherein A is a C—S covalent bond or a —CO—NH—$C_pH_{2p}$— group with p being an integer between 1 and 6, preferably between 2 and 4, B being most preferably a group —CO—NH—$C(CH_3)_2$—$CH_2$—.

Also preferably applied are copolymers with structural units of the formula (II) derived from vinylsulfonic acid, 2-acrylamido-2-methylpropane sulfonic acid, 2-methacrylamido-2-methylpropane sulfonic acid, styrene sulfonic acid and/or their alkaline metal salts and/or their ammonium salts. Especially preferred are structural units of the formula (II) derived from 2-acrylamido-2-methylpropane sulfonic acid and/or from 2-methacrylamido-2-methylpropane sulfonic acid and/or from their alkaline metal salts and/or from their ammonium salts.

Further preferably applied monomers which are optionally used in the manufacture of the copolymers are chosen from ethylenically unsaturated carboxylic acid and/or their derivatives of the formula (III), preferably chosen from the group of alkylesters from ethylenically unsaturated carboxylic acid, oxyalkylesters of ethylenically unsaturated carboxylic acid and/or esters of ethylenically unsaturated carboxylic acids with N-dialkylalkanolamines.

The ethylenically unsaturated carboxylic acids of the formula (III) are preferably acrylic acid, methacrylic acid, fumaric acid, maleic acid, itaconic acid and/or crotonic acid as well as their alkaline metal salts and/or their ammonium salts. The alkylesters of ethylenically unsaturated carboxylic acids are preferably alkylesters of acrylic acid, methacrylic acid, fumaric acid, maleic acid, itaconic acid and/or crotonic acid. Especially preferred are alkylesters with 1 to 6 carbon atoms.

The oxyalkylesters of an ethylenically unsaturated carboxylic acids of the formula (III) are preferably 2-hydroxyethylester of acrylic acid, methacrylic acid, fumaric acid, maleic acid, itaconic acid and/or crotonic acid.

The ester of ethylenically unsaturated carboxylic acid of the formula (III) with N-dialkylalkanolamine is preferably N,N-dimethylethanolamine methacrylate, its salt or quaternary ammonium product.

Further preferably applied copolymers with structural units of the formula (IV) are derived from N-vinylamides. The N-vinylamide is preferably N-vinylformamide, N-vinylacetamide, N-vinyl-N-methylacetamide, or N-vinylamide comprising cyclic N-vinylamide groups, preferably derived from N-vinylpyrrolidone, N-vinylcaprolactame or N-vinylpyridine.

Preferably applied are copolymers with structural units of the formula (V) are derived from vinylphosphonic acid and/or its alkaline metal salts and/or its ammonium salts, and/or allylphosphonic acid and/or its alkaline metal salts and/or its ammonium salts. Preferred copolymers used in the instant invention are those, wherein $R_1$, $R_2$, $R_3$, $R_4$, $R_{10}$, $R_{11}$, $R_{14}$, and $R_{17}$ are independently of one another hydrogen or methyl or wherein $R_5$, $R_9$, $R_{16}$, $R_{18}$ and $R_{19}$ are independently of one another hydrogen or a cation of an alkali metal, of an earth alkaline metal, of ammonia or of an organic amine.

Still other preferred copolymers used in the instant invention are those, wherein $R_6$ and $R_{12}$ is hydrogen and $R_7$ and $R_{13}$ is hydrogen or methyl, or wherein $R_6$ is —COOR$_9$ and $R_7$ is hydrogen or wherein $R_6$ is hydrogen and $R_7$ is —CH$_2$—COOR$_9$ or wherein Rue is hydrogen and $R_{13}$ is hydrogen or methyl, or wherein $R_{12}$ is —COOR$_{16}$ and $R_{13}$ is hydrogen or wherein $R_{12}$ is hydrogen and $R_{13}$ is —CH$_2$~COOR$_{16}$.

In particular, preferred are water soluble synthetic copolymers material which are selected from the group consisting of polymers containing:
(I) 10 to 90% by weight of structural formula I, preferred from 20 to 70% by weight,
(II) 1 to 80% by weight of structural formula II, preferred from 10 to 60% by weight,
(III) 0 to 10% by weight of structural formula III, preferred from 0 to 3% by weight,
(IV) 0 to 50% by weight of structural formula IV, preferred from 0 to 20% by weight,
(V) 0 to 20% by weight of structural formula V, preferred from 0 to 10% by weight, referred to the total mass of the polymer, with the proviso that the percentage of the structural units of formulae (I) to (V) refer to the total mass of the copolymer and the percentage of the structural units of formulae (I) to (V) amounts to 100%.

The copolymer used in the instant invention may be linear or branched or crosslinked either by covalent or ionic crosslinking.

The polymers can be synthesized by various technologies, e.g. by inverse emulsion polymerization, gel polymerizaiton or precipitation polymerization.

A viscosified treatment fluid is prepared by dissolving a solid polymer or by diluting a polymer solution or by inverting a water-in-oil polymer emulsion using water or an aqueous solution.

The aqueous solution may contain salts such as NaCl, KCl, CaCl$_2$, MgCl$_2$, NH$_4$Cl, NaBr, KBr, sodium formate, sodium acetate, and others.

The aqueous solution may further contain water miscible solvent as alcohols, e.g. methanol, ethanol, n- and i-propanol, glycol.

The aqueous polymer solution may further contain additives that are necessary for the treatment. Those additives may include buffer, surfactants, biocides, clay inhibitors and/or corrosion inhibitors.

The concentration of the polymer is typically from 0.01 to 10% by weight, preferred from 0.05 to 5% by weight and most preferred from 0.2 to 2% by weight, referred to the aqueous polymer solution. The term "water-soluble" it thereby met when the aforementioned concentration of the polymer in water is obtained.

To increase the viscosity of the treatment fluid, the polymers may also be ionically crosslinked by multivalent metal ions or metal complexes selected from group IIIA, IVB, VB, VIB, IIVB and/or VIIIB of the periodic table of elements, preferably selected form the ions and/or complexes of zirconium, aluminium, titanium, boron, chromium and/or iron. Especially preferred are the ions and/or complexes of zirconium and titanium. Typically water soluble salts of the multivalent metal ions are used. Suitable anions are e.g. halides, especially chloride, sulfate, lactate, citrate or gluconate. Also suitable are complexes of the multivalent metal ions with organic N- and O-compound, e.g. alcohols, di- and triols, mono-, di- and tri-carboxylic acids, mono-, di- and triamines and/or hydroxyalkylamines.

The quantity of transition metal compound for crosslinking the polymers ranges 0.1 to 50% by weight, preferred from 0.5 to 30%, more preferred from 1 to 20% by weight, referred to the total mass of polymer.

The transition metal compounds, e.g. the salts and/or complexes of transition metal cation, are dissolved and/or diluted in water or in a water miscible solvent, and then added to the polymer solution under stirring to ensure a homogenous distribution of transition metal cation in the solution. The crosslinking of the polymer chains can be retarded or accelerated by adaptation of the stirring speed, pH value and/or adjusting the temperature.

The viscosity of the viscosified fluids or of the crosslinked hydrogels provided in step (i) of the instant methods and prior to breaking typically ranges from about 10 mPas to several 1000 mPas, for example 3000 mPas.

Preferably, prior to breaking, the water-soluble polymeric gelling agent being a high molecular weight copolymer. The average molecular weight of the copolymers prior to breaking used according to the invention is higher than 1,000,000 Dalton, preferably higher than 3,000,000 Dalton.

The average molecular weight can be determined via gel permeation chromatography (GPC). Commercially available polymers, e.g. from acrylamide with molecular weight of 1,140,000 Dalton and 5,550,000 Dalton, can be used as standards. For separation of the sample a column consisting of a polyhydroxymethacrylate copolymer network with a pore volume of 30,000 Angstrom (A) can be used.

The K value according to Fikentscher serves as indicator for the average molecular weight of the copolymers according to the invention. To determine the K value, the copolymer is dissolved in a certain concentration (generally 0.5 weight %, in the instant invention 0.1 weight %) and the efflux time at 30° C. is determined by means of an Ubbelohde capillary viscometer. This value gives the absolute viscosity of the solution ($\eta c$). The absolute viscosity of the solvent is no. The ratio of the two absolute viscosities gives the relative viscosity $\eta_{rel}$ $$\eta_{rel} = \eta_c/\eta_o$$

From the relative viscosity, the K value can be determined as a function of the concentration c by means of the following equations:

$$\log \eta_{rel} = [(75k^2/(1+1.5kc)+k]c$$

$$k = K/1000$$

The K value of the copolymers used according to the invention is higher than 300 determined as 0.1 weight % copolymer concentration in deionized water, preferably is higher than 350.

Water

The water for preparing the treatment fluid according to this invention can be fresh water, e.g. river water, or natural occurring brines like seawater, formation water, produced water and/or flow back from a well after a stimulation process and mixtures thereof.

The water for preparing the polymer solution and the treatment fluid may contain salts comprising mono-, di-, or trivalent cations and or anions, non-limiting examples are lithium, sodium, potassium, strontium, ammonium, calcium, magnesium, barium, boron, aluminium, iron, fluoride, chloride, bromide, sulphate, carbonate, acetate, formate. TDS (total dissolved solids) may range from 50 ppm e.g. for fresh water to 330 000 ppm for high saline brines.

The instant invention allows for broken polymer acting as scale inhibitor even at high ion concentrations, in particular using water for the preparation of the treatment fluids having a TDS of preferably at least 1000 ppm, more preferred at least 5000 ppm, more preferred at least 15000 ppm, in particular at least 30000 ppm and in particular preferred at least 40000 ppm.

Breaker

According to the instant invention, the breaker is selected from organic and/or inorganic peroxides, e.g. persulfates, percarbonates, perborates, diacyl peroxides, peroxy dicarbonates, dialkyl peroxides, alkylhydroperoxides and/or ester of peracids. Oxidizing compound as e.g. chlorites or bromates can also be used as well as aliphatic azo compounds.

Typically, the quantity of the breaker composition ranges from 0.001 to 5% by weight, preferred from 0.01 to 1%, referred to the total mass of aqueous polymer solution.

The breaker composition degrades the polymeric gelling agent, in particular the synthetic copolymers defined by the aforementioned formulae (I) to (V). The degree of breaking can be determined by measuring the viscosity of the viscosified fluid prior to breaking and after the breaker degrading the polymeric gelling agent, in particular the synthetic copolymers. Prior to breaking, typically, the viscosity ranges from about 10 mPas to several 1000 mPas and after the breaker degrading the polymeric gelling agent, in particular the synthetic copolymers, the viscosity is reduced by at least 90%, preferably by at least 99%.

The breaker compounds are commercially available from various companies, e.g. from Akzo Nobel, Pergan, or United Initiators.

Preparation of the Scale Inhibitor

Typically, the treatment fluid can be prepared by adding breaker and if wanted the crosslinker or their solutions to the solution of the gelling agent, such as synthetic polymer material, under stirring to ensure a substantially homogeneous distribution of all ingredients within the treatment fluid. If necessary, further additives can be present or can be added e.g. pH buffer material or other substances to adjust the pH value. The so prepared treatment fluid is then pumped into the formation.

The sequence of the addition of the crosslinker solution, the breaker composition or its solution, and, if necessary, further solutions of additives to the polymer solution can be varied. It is also possible to add them all simultaneously, e.g. continuously during pumping of the polymer solution into the formation. It is preferred to add first the breaker or their solutions, respectively, to the aqueous polymer solution and then add the crosslinker solution and/or solutions of additives if necessary directly before introducing the treatment fluid into the formation.

After some time of close contact of the gelling agent, such as the polymer, and the breaker system the polymer is degraded and the viscosity of the treatment fluid is reduced. The reduction of the viscosity is dependent on the conditions in the formation, e.g. temperature, pH, concentrations of polymer, breaker and of the time.

The degraded polymer having a low molecular weight that is acting as scale inhibiting compound is formed during the breaking process. As the molecular weight corresponds with the viscosity of the solution of the polymer, the degradation can be followed by determination of the viscosity of the treatment fluid with time. The polymer degradation can be followed either directly in a rheometer or by determination of the viscosity of the polymer solution before and after breaking treatment using either a rotational rheometer or a capillary viscosimeter.

The viscosity of the polymer solution according to the invention is—after allowing the breaker composition to degrade the polymeric gelling agent, in particular the synthetic copolymers,—reduced by at least 90%, preferably by at least 99%. Thus the viscosity is less than 5 mPas, preferred less than 2 mPas and most preferred less than 1 mPas.

The concentration of the viscosifying polymer in the treatment fluid causes the concentration of the scale inhibitor formed from that polymer and typically varies from 0.01 to 10% by weight, preferred from 0.05 to 5% by weight and most preferred from 0.2 to 2% by weight, referred to the aqueous polymer solution. As the treatment fluid enters the formation, it is diluted by formation water and the concentration of the broken polymer is reduced depending on the mixing ratio. The mixing of treatment fluid and formation water during the fracturing process is the main reason for scaling.

Due to the presence of the broken polymer the scaling of sulphates or carbonates is reduced without special measures taken. However, if necessary, additional scale inhibitor can be added to treatment fluid.

Test Methods

The following testing methods are used:
The viscosity was determined using a Fann 35 rheometer or Ubbelohde capillary viscosimeter.

The Fann 35 rheometer is a Couette type coaxial cylinder rotational viscometer, equipped with R1 rotor sleeve, B1 bob and F1 torsion spring. 120 ml of the sample were poured into the viscometer cup and characterized at 100 rpm and room temperature.

For the Ubbelohde capillary viscosimeter the capillary of appropriate width was chosen, about 30 ml of the sample were filled into the capillary. The capillary was then allowed to adjust temperature to 30° C. for 10 min in a water bath. The time of the defined sample volume for passing through the capillary was taken and then multiplied with the capillary constant to give the viscosity in mPas.

For scaling tests aqueous salt solutions of defined concentration were prepared using soluble salts, one containing the anion of the scale forming salt (called anion brine), the other containing the cation of the scale forming salt (called cation brine). Both solutions were mixed to achieve a defined concentration of the scale forming salt. The solution was checked visually for turbidity. To investigate the effect of scale inhibitor, the compound was added to either the cation or anion brine prior to mixing and again turbidity was observed and compared with the reference mixture without scale inhibitor.

For investigation of the inhibiting effect on $CaSO_4$ scaling at high temperature, the salt solution with or without scale inhibitor was heated in an autoclave to the desired temperature and held for defined time. After fast cooling of the autoclave the precipitate was filtered using filter paper with 20 to 45 µm pore width. The filter paper then was treated for 24 h with cold water to dissolve precipitated $CaSO_4$ again. The Ca concentration of this aqueous solution was determined and from the result the amount of precipitated $CaSO_4$ was calculated.

Abbreviations

HLB HLB-value means the hydrophilic-lipophilic balance of a surfactant and is a measure of the degree to which it is hydrophilic or lipophilic, determined by calculating values for the different regions of the molecule. There are different methods to calculate the HLB-value. The most common results in a ranking of the surfactants between 0 and 20 with 0 corresponds to a completely lipophilic/hydrophobic molecule, and a value of 20 corresponds to a completely hydrophilic/lipophobic molecule. Typically, the suppliers specifies the HLB-value of the surfactant.

ICP EOS inductively coupled plasma optical emission spectrometry $\eta_o$ Viscosity of solvent solution for K value determination $\eta_c$ Viscosity of copolymer solution for K value determination $\eta_{rel}$ Relation of $\eta_c$ relative to $\eta_o$ c Concentration of polymer in solution, determination of K value The following examples illustrate the invention without limiting it.

EXAMPLES

Example 1: Preparation of a Polymer Via Inverse Emulsion Polymerization 37 g sorbitan monooleate were dissolved in 160 g $C_{11}$-$C_{16}$ isoparaffin. 100 g water in a beaker were cooled to 5° C., then 50 g 2-acrylamido-2-methylpropane sulfonic acid and 10 g vinylphosphonic acid were added. The pH was adjusted to 7.1 with aqueous ammonia solution. Subsequently 268 g acryl amide solution (50 weight % in water) were added.

Under vigorous stirring the aqueous monomer solution was added to the isoparaffinic mixture. The emulsion was then purged for 45 min with nitrogen.

The polymerization was started by addition of 0.5 g azoisobutyronitrile in 12 g isoparaffin and heated to 50° C. To complete the reaction the temperature was increased to 80° C. and maintained at this temperature for 2 h. The polymer emulsion was cooled to room temperature. As product, a viscous fluid was obtained.

The K-value of was determined to be 390 as 0.1 wt.-% polymer solution in deionized water containing 0.5 wt.-% of an ethoxylated $C_{13}$ alcohol having a HLB of >10.

Example 2: Preparation of a Polymer Via Inverse Emulsion Polymerization

A polymer emulsion was prepared according to example 1 but using 58 g 2-acrylamido-2-methylpropane sulfonic acid, 5.5 g acrylic acid and 238 g acryl amide solution (50 weight % in water). The K-value of this polymer determined as in Ex. 1 was 445.

Example 3: Preparation of a Polymer Via Gel Polymerization 400 ml deionized water and 19.3 ml 25 weight-% aqueous ammonia solution were placed in a reaction vessel. 20 g N,N-dimethylacryl amide, 30 g 2-acrylamido-2-methylpropane sulfonic acid, and 10 g acrylic acid were added under stirring. The solution was purged with nitrogen and heated to 50° C. The polymerization was started by addition of 5 ml of a 20% by weight aqueous solution of ammonium persulfate. To complete the reaction, the temperature was increased to 80° C. and maintained at this temperature for 2 h. After cooling to room temperature a highly viscous gel was obtained. The gel was dried at 90° C. in a vacuum drying oven and carefully chopped from time to time. The dried polymer was crushed to obtain small particles. The K-value of this polymer determined as in Ex. 1 was 392.

Example 4: Preparation of a Polymer Via Gel Polymerization

A polymer was prepared according to example 3 but using 12.7 ml 25 weight-% aqueous ammonia solution, 10 g 2-acrylamido-2-methylpropane sulfonic acid, 15 g vinylsulfonic acid, and 60 g acryl amide solution (50 weight % in water). The K-value of this polymer determined as in Ex. 1 was 355.

Example 5 to 12

A polymer solution was prepared by mixing 200 ml tap water, 0.7 g of an ethoxylated $C_{13}$ alcohol having a HLB of >10 and polymer emulsion or polymer powder. Mixing was continued until the emulsion was completely inverted or the polymer was completely dissolved.

The viscosity of the linear gel was determined using a Fann rheometer at 100 rpm. Then ammonium persulfate was added under mixing. The mixture was transferred into a borosilicate glass bottle, the bottle was closed and put into a water bath of 95° C. for 4 h to break the polymer. After cooling, the viscosity was determined using Ubbelohde capillary.

30 g of a 1% by weight $CaCl_2$) solution were prepared and solution of the broken polymer was added. After thorough mixing, 30 g of a 1% Na2SO4 solution were added under mixing. Then the solution was checked visually.

Details on the used polymer, the concentrations and the results are summarized in table

| | | Preparation of linear gel | | | Broken | Scaling test | |
|---|---|---|---|---|---|---|---|
| Ex. | Polymer | Emulsion, g | Powder, g | Viscosity, mPas | polymer Viscosity, mPas | Broken polym., g | Result after 1 h |
| 5 | — | | | | | | crystals |
| 6 | Ex. 1 | 2.5 | | 30 | 0.78 | 0.3 | clear solution |
| 7 | Ex. 1 | 2.5 | | 30 | 0.78 | 10 | clear solution |
| 8 | Ex. 2 | 2.66 | | 46.5 | 0.81 | 10 | turbid |
| 9 | Ex. 2 | 2.66 | | 46.5 | 0.81 | 0.3 | crystals |
| 10 | Ex. 3 | | 0.78 | 24 | 0.8 | 10 | crystals |
| 11 | Ex. 4 | | 0.78 | 23 | 0.85 | 10 | clear solution |
| 12 | CMHPG | | 1.0 | 78 | 0.76 | 10 | crystals |

The test results clearly show that broken polymer containing monomers bearing phosphonic and/or sulfonic groups are effective to prevent the precipitation of $CaSO_4$. On the other hand, broken polymers without a phosphonic group but containing carboxylic group cannot inhibit the formation of $CaSO_4$-crystals. Also, the broken solution of natural based CMHPG does not inhibit scaling.

Examples 13 to 19

Broken polymer solutions from different polymers were prepared according to the procedure described in examples 5 to 12.

A synthetic brine containing 36 500 ppm Na, 500 ppm K, 7500 ppm Ca, 3000 ppm Mg, 1000 ppm sulfate and 75 000 ppm chloride was prepared.

To 200 ml of the synthetic brine broken polymer solution was added, the quantities given in table 2. The solution was transferred into teflon lined autoclaves, sealed and put in an electric oven at 175° C. for 20 h. After cooling down the autoclaves using cold water, they were opened and $CaSO_4$ crystals grown at the wall due to the reduced solubility at high temperature were carefully removed and stirred in the water. The solution or slurry was filtered using a 20 to 40 μm filter paper with 1.5 cm in diameter. The filter paper was then dunked into a 10 ml of cold distilled water and held there for 20 h at a temperature between 7 to 10° C. At the low temperature $CaSO_4$ from the filter paper can dissolve again. The Ca content in the water was determined using ICP EOS. From the Ca content the quantity of $CaSO_4$ that precipitated during the scaling experiment was calculated.

| | Broken polymer solution | | Scaling test | | |
|---|---|---|---|---|---|
| Ex. | Made from polymer of | Viscosity of broken polymer solution, mPas | Quantity added to 200 ml synth. brine, g | Visual inspection after 20 h at 177° C. before filtration | Ca content after dissolution in 10 ml water, ppm | $CaSO_4$ precipitated in the fluid, calculated, mg/kg |
| 13 | — | | | fine crystals | 386 | 131 |
| 14 | CMHPG | 0.76 | 1.0 | crystals | 298 | 101 |
| 15 | Ex. 1 | 0.78 | 0.5 | very few tiny crystals | 27 | 9 |
| 16 | Ex. 1 | 0.78 | 2.0 | very few tiny crystals | 48 | 16 |
| 17 | Ex. 2 | 0.81 | 1.0 | crystals | 289 | 98 |
| 18 | Ex. 4 | 0.85 | 0.5 | few tiny crystals | 64 | 22 |
| 19 | Commercial phosphonate scale inhibitor | | 1.0 (of 1% solution) | turbid | 49 | 17 |

It can be clearly seen that the broken polymer solutions from polymers prepared according to Ex. 1 and Ex. 4 prevent $CaSO_4$ from precipitation. Similar results are obtained using a commercially available phosphonate scale inhibitor.

In contrast, solution of broken polymer of Ex. 2 showed comparable results as the reference example without addition of scale inhibitor. Also solution of broken CMHPG could not prevent precipitation of $CaSO_4$.

The invention claimed is:

1. A method for preparation of a scale inhibitor comprising:
    providing a viscosified treatment fluid containing at least water, a water soluble polymeric gelling agent, an oxidizing breaker compound, and no external scale inhibitor agent, wherein the water contains at least 1,000 ppm total dissolved solids (TDS);
    (ii) pumping the viscosified treatment fluid into a formation and
    (iii) allowing the oxidizing breaker compound to degrade the water soluble polymeric gelling agent being a synthetic polymer comprising:
    (I) at least structural units of formula (I)

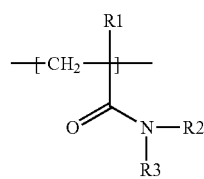

wherein

R1, R2 and R3 independently are hydrogen or $C_1$-$C_6$-alkyl, and (II) from 1 to 95% by weight structural units of formula (II)

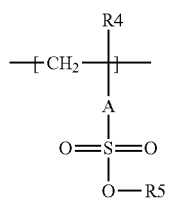

(II)

wherein

R4 is hydrogen or $C_1$-$C_6$-alkyl,

R5 is hydrogen, a cation of an alkaline metal, of an earth alkaline metal, of ammonia and/or of an organic amine, A is a covalent C—S bond or a two-valent organic bridging group, after the breaker degrading the synthetic polymer into oligomeric or monomeric chain fragments; and the oligomeric or monomeric chain fragments preventing scale depositing in the formation.

2. The method of claim 1 wherein a viscosity of the viscosified treatment fluid after breaking in measure (iii) is less than 5 mPas.

3. The method of claim 1, wherein the water soluble synthetic polymer material is selected from the group consisting of polymers containing:

(I) 10 to 90% by weight of structural units of formula I, and (II) 1 to 80% by weight of structural units of formula II, referred to a total mass of the polymer, with the proviso that the percentage of the structural units of formulae (I) to (II) refer to a total mass of the copolymer and a percentage of the structural units of formulae (I) to (II)-amounts to 100%.

4. The method of claim 1, wherein a quantity of the synthetic polymer ranges from 0.01 to 10% by weight, referred to a total mass of aqueous polymer solution.

5. The method of claim 1, wherein the breaker compound is selected from the group of inorganic peroxides, persulfates, percarbonates, and perborates.

6. The method of claim 1, wherein a quantity of the breaker compound ranges from 0.001 to 5% by weight, referred to a total mass of aqueous polymer solution.

7. The method of claim 1, wherein the viscosified treatment fluid containing at least a synthetic water soluble gelling agent contains multivalent metal ion.

8. The method of claim 1, wherein the viscosified treatment fluid is injected as hydraulic fracturing fluid.

* * * * *